United States Patent [19]

Sheets

[11] Patent Number: 4,850,307
[45] Date of Patent: Jul. 25, 1989

[54] INTAKE CUP APPARATUS

[75] Inventor: Keith A. Sheets, Nappanee, Ind.

[73] Assignee: CTB, Inc., Milford, Ind.

[21] Appl. No.: 116,557

[22] Filed: Nov. 3, 1987

[51] Int. Cl.$^4$ .............................................. A01K 5/00
[52] U.S. Cl. ................................................ 119/51 R
[58] Field of Search .............. 119/51 R, 52 R, 52 AF, 119/51.11

[56] References Cited

U.S. PATENT DOCUMENTS

| | | | |
|---|---|---|---|
| 2,652,026 | 9/1953 | Iddings | 119/52 R |
| 3,125,989 | 3/1964 | Cordis | 119/52 R |
| 3,415,228 | 12/1968 | Myers | 119/52 AF X |
| 3,523,519 | 8/1970 | Hostetler | 119/52 AF |
| 3,545,408 | 12/1970 | Wert | 119/51.11 |
| 3,561,403 | 2/1971 | Wilson, Jr. | 119/51.11 |
| 3,611,995 | 10/1971 | Murlo | 119/52 R X |
| 3,625,183 | 12/1971 | Tartar | 119/51.11 |
| 4,355,596 | 10/1982 | Peppler | 119/52 AF X |
| 4,495,894 | 1/1985 | Swartzendruber | 119/52 AF X |

Primary Examiner—Gene Mancene
Assistant Examiner—R. Thomas Price
Attorney, Agent, or Firm—Richard Bushnell Trexter, Bushnell, Giangiorgi & Blackstone

[57] ABSTRACT

An improved intake cup apparatus for use in an automated feeding system of the type utilizing feed supply conduits and feed conveyors providing troughs to present feed to caged poultry and the like. The improved intake cup properly meters and directs feed from the supply conduits to the feed conveyors and assures the conveyors will not become over-filled. The physical structure of the improved intake cup apparatus comprises a cup body having openings formed therein to receive feed from a supply conduit and allow a helical auger-like element of the feed conveyor to pass through the cup body and collect feed therefrom. Collection of feed by the auger-like element as it proceeds through the cup is restricted however, by an open-sleeve member partially surrounding the auger within the cup body and a restrictor plate partially covering the remaining auger access. Certain void areas are also created adjacent the auger and thereby assure overfilling will not occur. Deflector and supply apparatus are also provided within the improved intake cup apparatus to properly distribute the weight forces associated with the incoming feed and appropriately meter feed flow into the auger-like element.

18 Claims, 2 Drawing Sheets

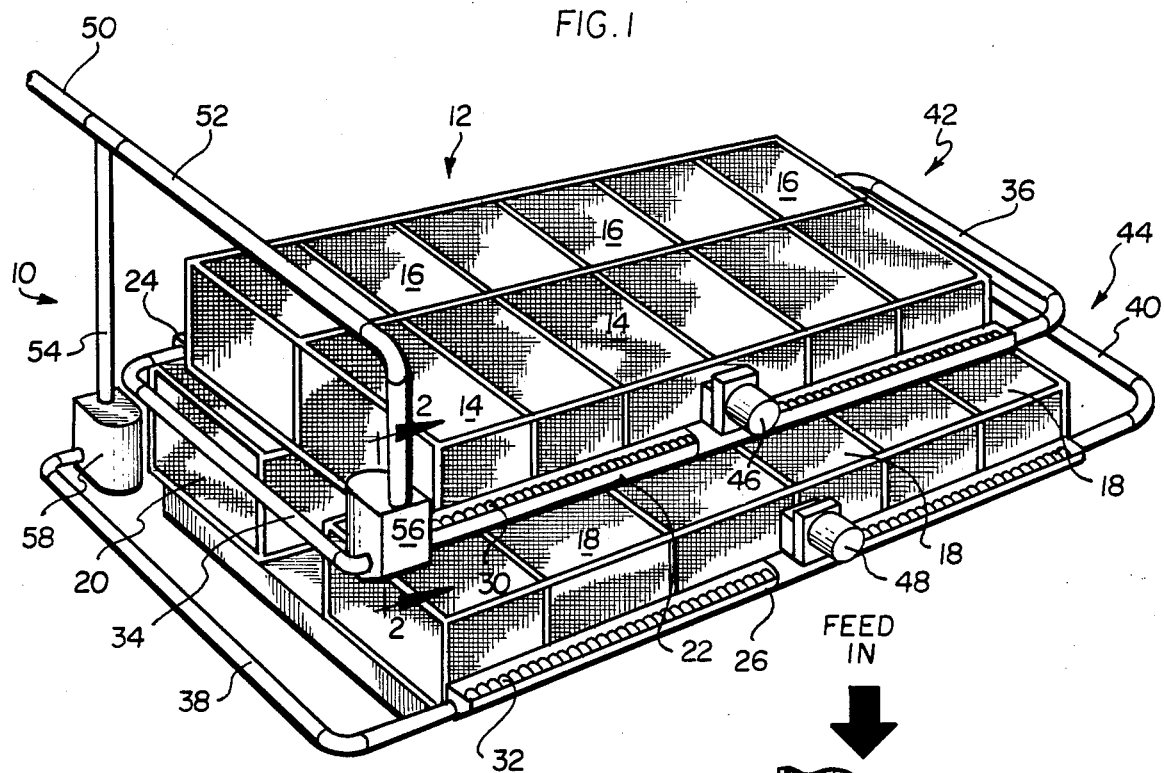

INTAKE CUP APPARATUS

BACKGROUND OF THE INVENTION

This invention is directed generally to the automated feeding apparatus art and more specifically to an improved intake cup for directing and metering the flow of feed from a feed supply conduit to a moving feed conveyor.

Automated feeding apparatus and intake cups of the type here involved are commonly used in large-scale commercial poultry raising operations requiring extensive mechanization and automation to feed large stocks of poultry in relatively large poultry houses. In egg producing or layer operations, the birds are normally individually confined in cages so that feed can be delivered economically both at desired intervals of time and in accurate rationed amounts. To facilitate these feeding operations, a back-to-back, rows of cages, and an automated feeding system adapted thereto, is generally preferred. Such a cage arrangement is shown in U.S. Pat. No. 4,060,055 and a feeding system capable of use therewith is seen in U.S. Pat. No. 4,495,894 (hereinafter referred to as the '894 patent).

The '894 patent shows a feeding system using feed troughs extending in front of each row of adjacent bird cages. Feed in the troughs is delivered by way of auger-like helical conveying elements located inside the feed troughs being axially driven to transport feed from a system of supply conduits into the troughs. Preferably, the feed troughs for each of the two rows of bird cages located in a single tier of the pyramidal cage arrangement are interconnected, thereby allowing the helical conveying elements within the troughs to be formed in a continuous loop and be driven by a single sprocket and motor situated along its path.

As indicated above, it is desired to deliver feed rations which are accurate and uniform both in quantity and quality to each poultry-containing cage. That is, each bird should receive a certain amount of each constituent of the feed mix, and the relative amounts of each constituent should not be varied excessively throughout the delivered rations. However, it is known that the heavier or more dense feed constituents tend to fall to the bottom of the conveyor or trough as the feed is advanced therealong. Additionally, birds tend to pick off the upper layers of feed from the trough, so that the feed may tend to be "picked over" by the birds at or near the upstream or delivery end of the conveyor system prior to reaching the birds downstream.

U.S. Pat. No. 4,640,230, (hereinafter referred to as the '230 patent) shows at least two improvements to the '894 patent. First, complementary angled or tilted faces of the helical conveying element on the one hand and of the sprocket or gear-like drive member on the other hand are provided, such that the helical conveying element slowly rotates as it is driven in a generally axial fashion by the rotating gear or sprocket, thereby maintaining a constant mixing of the feed during delivery.

Secondly, the '230 patent prevents birds from "picking over" the feed until the feed has been delivered to all the cages by placing the helical conveying element in the trough such that the birds are prohibited by the axial advancement thereof from reaching therethrough to the feed being transported in the trough.

It will be recognized that in a conveyor system of the foregoing type, further improvement can be had by insuring that a relatively constant flow or amount of feed is delivered to the helical conveying element during advancement thereof for feed distribution around the system. To this end, U.S. Pat. No. 4,667,623 discloses an intake cup apparatus comprising a housing extending around a portion of an auger-like conveyor element and having a feed metering gate structure mounted interiorly of the housing to direct and control the rate of flow of feed into the conveyor element.

SUMMARY OF THE INVENTION

It is a primary objective of the present invention to provide an improved intake cup apparatus to be used in an automated conveyor-type feeding system for directing and controlling the rate of flow of feed into a feed conveyor portion thereof.

Another object of the invention is to provide an intake cup apparatus of the foregoing type which prohibits over-filling of a helical conveying element forming part of a feed conveyor.

A related object is to provide an intake cup apparatus of the type referred to which allows for the creation of certain void areas as a means for assuring the helical conveying element will not become over-loaded with feed.

Summarily stated, the invention comprises an intake cup apparatus for controlling and directing feed within, and forming part of, an automated feeding system for poultry and the like. The automated feeding system has a bulk feed storage container, a main supply conduit leading therefrom and branching off into at least one feed supply conduit, the intake cup apparatus, and a feed conveyor system providing poultry and the like with access to the feed. Each intake cup apparatus is situated between a feed supply conduit and a feed conveyor thereby interconnecting the two portions of the system.

An intake cup apparatus comprises a cup body having an inlet opening in a top surface thereof for receiving feed from a feed supply conduit located thereabove. Conveyor openings are further provided in cup body side walls for interconnecting the intake cup with the feed conveyor and providing a course by which a helical conveying element forming part of the feed conveyor can pass through the intake cup.

Inside the cup body an open-sleeve means guides and partially surrounds the helical conveying element as it passes through the intake cup body. The open portion of the open-sleeve means presents a limited passage through which feed in the cup can pass into the helical conveying element as discussed in detail below. The configuration and positioning of the open-sleeve within the cup body further provides a first safeguard against over-filling of the helical conveying element as is also discussed in detail below.

Initially, feed entering the intake cup is deflected and directed in-part away from the helical conveying element by a deflector means also mounted interiorly of the cup body. Thereafter, feed so directed is metered toward the helical conveying element and through a portion of the passage provided in the open-sleeve means by a delivery means which preferrable is a gear-like device driven by the axial movement of the conveying element passing through the intake cup body. Feed passage through the entire passageway provided in the open-sleeve means is prevented by a restrictor place means disposed above the helical conveying element and covering approximately one half of the open-sleeve passage in the direction of movement of the conveying element, thereby creating a void area between the restrictor plate means, the conveying element, and a portion of the delivery means. The void area provides a location into which feed can fall out of the conveying element and thereby provides further assurance that the conveying element and thus the feed conveyor will not become over-filled.

BRIEF DESCRIPTION OF THE DRAWINGS

FIG. 1 is a perspective view of an automated feeding system showing the intake cup apparatus comprising the present invention as normally included therein, FIG. 2 is a sectional elevational view of the intake cup apparatus taken along line 2—2 of FIG. 1.

DETAILED DESCRIPTION OF THE INVENTION

Figure 3:
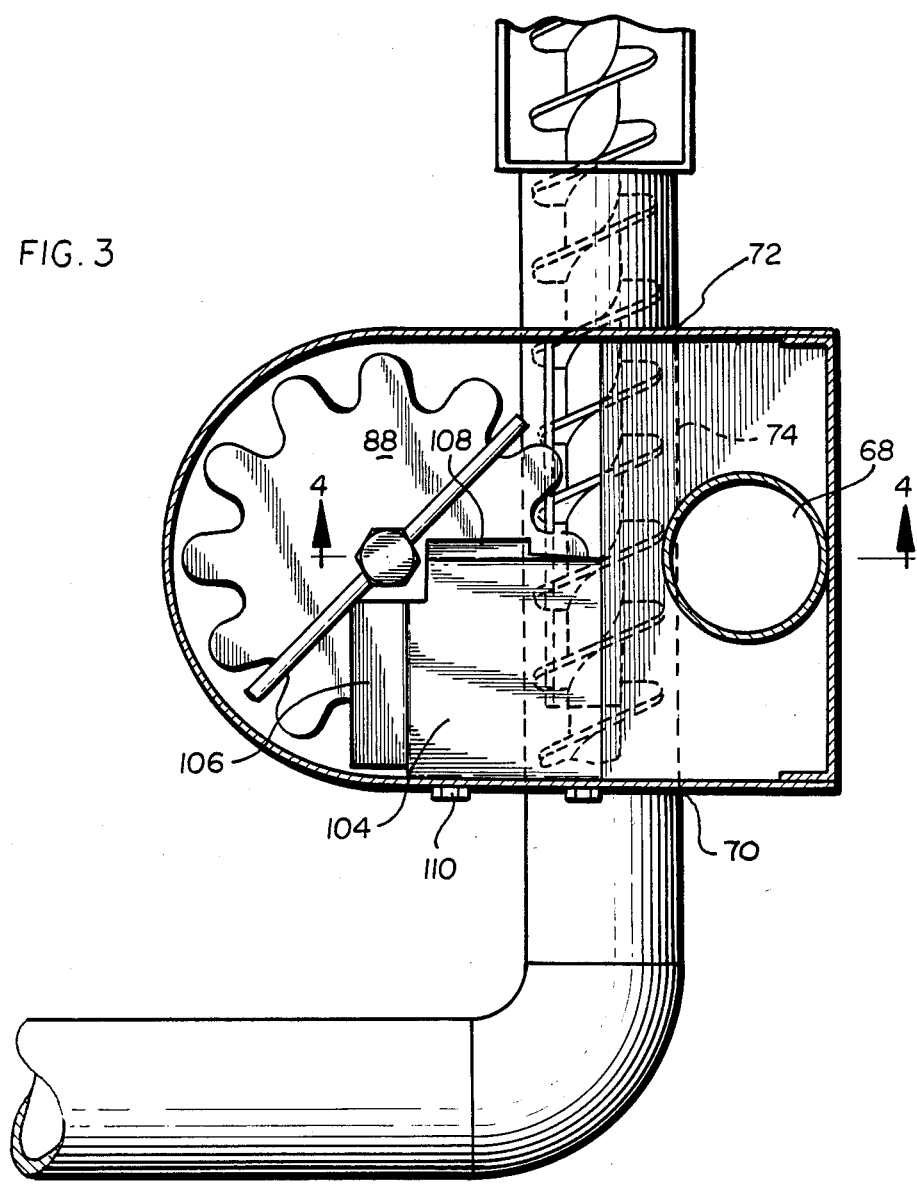
FIG. 3 is a sectional view taken along line 3—3 of FIG. 2.

While the invention will be described in connection with a preferred embodiment, it will be understood that it is not intended to limit the invention to that embodiment. On the contrary, it is intended to cover all alternatives, modifications and equivalents as may be included within the spirit and scope with the invention.

In its preferred embodiment, the invention here disclosed in used in conjunction with, and forms part of an automated feeding system 10 which is adapted for use with rows of cages 12 such as are used commonly to contain poultry or the like in egg laying operations. This type of cage arrangement 12 is shown in FIG. 1. Upon inspection of FIG. 1, it will be seen that pairs of back-to-back upper row cages 14 and 16 face opposite directions, as do pairs of back-to-back lower row cages 18 and 20, in the arrangement shown to illustrate the invention. Elongated open troughs 22, 24, 26 and 28 extend in front of each of the two rows of cages on each tier of the pyramid arrangement such that feed in the troughs can be selectively presented to the birds confined therein. Feed is carried into an upper trough tier formed by open troughs 22 and 24, and a lower trough tier formed by open troughs 26 and 28 by way of helical conveying elements 30 and 32, respectively.

As can be easily envisioned in FIG. 1, the helical conveying elements 30 and 32 comprise a continuous loop and service an entire tier of open troughs by extending through the troughs themselves and inside side tubes 34 and 36 interconnecting upper troughs 22 and 24, and side tubes 38 and 40 interconnecting lower open troughs 26 and 28. Collectively, open upper troughs 22 and 24, side tubes 34 and 36, and helical conveying element 30 comprise an upper feed conveyor 42. In like manner, lower open troughs 26 and 28, side tubes 38 and 40, and helical conveying element 32 together comprise a lower feed conveyor 44.

Drive means 46 and 48 are also provided as shown in FIG. 1 for establishing movement of the helical conveying elements 30 and 32 around feed conveyors 42 and 44 in a generally axial direction. Preferably, drive means 46 and 48 also simultaneously rotate helical conveying elements 30 and 32 at a rate of rotation which is relatively slow in relation to the rate of axial advancement provided, so as to slowly mix and blend the feed as it is conveyed.

Feed is preferably delivered to the feed conveyors 42 and 44 from a bulk storage container (not shown) by way of a main supply conduit 50 which branches into feed supply conduits 52 and 54 which then connect with intake cups 56 and 58. In the present form of the invention, the intake cups 56 and 58 are designed to direct and control the rate of feed flow into the feed conveyors 42 and 44 thereby assuring that the helical conveying elements 30 and 32 do not become over-filled with feed. That is, the intake cups 56 and 58 will prevent the level of feed in the open troughs 22, 24, 26 and 28 from reaching a level at which the caged birds can reach through the helical conveying elements 30 and 32 and pick at the feed, until such time as a uniform supply thereof is presented to all the cages in the arrangement.

Figure 4:
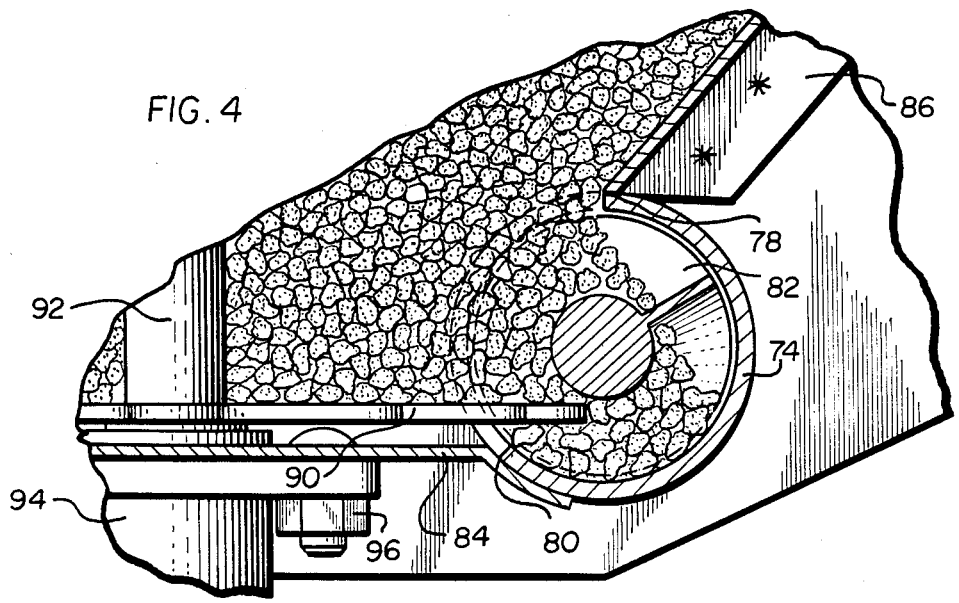
FIG. 4 is an enlarged partial sectional view taken along line 4—4 of FIG. 3.

Turning now to FIGS. 2, 3 and 4 to examine the details of the invention, it is seen that intake cups 56 and 58 comprise a cup body 60 having a top surface 62, a semi-cylindrical sidewall surface 64 and a bottom surface 66. Top surface 62 has an inlet opening 68 through which feed supply conduits 52 and 54 extend to allow feed to enter and fill the cup body 60. To complete the inner connection between the intake cup 56 and 58 with the remainder of the automated feeding system 10, feed conveyor openings 70 and 72 are provided in sidewall 64. The conveyor openings are used to connect the intake cups with feed conveyors 42 and 44 and provide means by which helical conveying elements 30 and 32 can enter and exit the intake cups 56 and 58. Once inside the intake cups 56 and 58, the helical conveying elements 30 and 32 are partially surrounded by and guided through the cup body 60 by an open-sleeve means 74 which is preferably a C-shaped member and extends across length of the cup body 60 between conveyor openings 70 and 72.

As best seen in FIGS. 2 and 4, the open-sleeve 74 is mounted interiorly of the cup body 60 such that a limited opening 76 formed spans between a top edge 78 and a bottom edge 80 of the open-sleeve 74. As will be discussed in greater detail below, feed within the cup body 60 entering the helical conveying elements 30 and 32 through limited opening 76 will be prohibited from filling a first void area 82 shown best in FIG. 4. Creation of the void area 82 is due largely in part to the location of top edge 78 and its effect on the feed in the cup body 60. As long as the void 82 exists, the helical conveying elements 30 and 32 cannot become completely filled with feed and thus the void area 82 represents a first safeguard against over-filling of the feed conveyors 42 and 44.

Bottom edge 80 of open-sleeve 74 is securely mounted on cantilever base 84 which in turn is secured to sidewall 64 near bottom surface 66 of cup body 60. Top edge 78 of open-sleeve 74 is mounted to cup body 60 by way of deflector means 86 as shown in FIG. 2. In operation, deflector means 86, which preferably comprise a smooth plate mounted acutely between top edge 78 and sidewall 64, serves to deflect and direct feed being received through supply conduits 52 and 54 along a slope thereof and thereby removes the force of feed weight associated therewith from directly bearing upon the helical conveying elements 30 and 32.

Thereafter, feed deflected away from helical conveying elements 30 and 32 is metered back toward limited opening 76 by delivery means 88 which, as illustrated, takes the form of a gear wheel 90 mounted horizontally on elongate shaft member 92. The shaft 92 itself is mounted for rotation in bearing 94 which is secured to cantilever base 84 by fasteners 96 and provided with lubrication nipple 98. Agitator 100 may also be mounted for rotational movement in unison on top of shaft 92 and secured by nut 102 so as to agitate the feed within cup body 60 above delivery means 90. Rotation of delivery means 88 and agitator 100 occurs as a result of the engagement between gear wheel 90 and helical conveying elements 30 and 32 as the helical conveying elements are driven through cup body 60. Consequently, feed carried by delivery means 88 is metered through limited opening 76 and transported away in feed conveyors 42 and 44.

As thus far described, feed in the intake cups 56 and 58 will pass into helical conveying elements 30 and 32 throughout the entire length of limited orifice 76. However, in keeping with one of the principle objects of the invention, further restriction is placed on limited opening 76 by the provision of a restrictor plate means 104 having flap portions 106 and 108. Preferably, the restrictor plate means 104 is secured to sidewall 64 by bolts 110 such that it shields substantially one-half of limited opening 76 as the helical conveying elements 30 and 32 exit cup body 60. So disposed, the restrictor plate 104 creates a second void area 112 therebelow into which excess feed carried in helical conveying elements 30 and 32 can fall prior to reaching the feed troughs 22, 24, 26 and 28. In this regard, it is important that gear wheel 90 is positioned below a centerline of the helical conveying elements 30 and 32 so as to insure that delivery means 88 will catch feed falling out of the helical conveying elements 30 and 32 and return it to the limited opening 76 on a subsequent cycle of the gear wheel 90.

So constructed, the novel intake cups 56 and 58 operate to insure proper feed levels in feed conveyors 42 and 44 and avoid the problems associated with over-filling the feed troughs discussed above.

The invention is claimed as follows:

1. An intake cup for directing and metering feed within an automated feeding system having a feed conveyor including an axially moving helical conveying element and a feed supply conduit, said intake cup comprising: a cup body having an inlet opening in a top surface thereof for receiving feed from said feed supply conduit and conveyor openings for connecting said intake cup with said feed conveyor and providing means whereby said moving helical conveying element enters and exits said intake cup; open-sleeve means for partially surrounding and guiding said moving helical conveying element through said intake cup and presenting a limited opening for allowing feed inside the intake cup to flow into the moving helical conveying element and at the same time preventing the feed conveyor from becoming over-filled; deflector means for initially directing feed entering said cup body by way of said inlet opening and keeping feed weight forces associated therewith from bearing directly upon said moving helical conveying element; delivery means for metering feed directed away from said moving helical conveying element by said deflector means past said limited opening in said open-sleeve means and into said moving helical conveying element; and restricting means for further restricting the limited opening in said open-sleeve through which feed can pass into said moving helical conveying element and for creating a void area into which feed can fall out of the moving helical conveying element and onto the delivery means thereby assuring said feed conveyor does not become over-filled with feed and present improper feed levels in the automated feeding system.

2. The intake cup of claim 1, wherein said open-sleeve means comprises a cylindrical C-shaped tube member loosely surrounding said moving helical conveying element and having said limited opening formed therein beginning approximately directly above an uppermost portion of said moving helical conveying element and facing said delivery means mounted within said cup body thereby providing a passage by which feed can be delivered into said moving helical conveying element and creating an open area into which feed may not enter, between said C-shaped tube member and said helical conveying element thereby aiding in preventing over-filling of said feed conveyor.

3. The intake cup of claim 1 wherein said deflector means comprises a plate-like member mounted within said intake cup body substantially directly below said inlet opening to support the feed in the feed supply conduit when the intake cup is filled and to direct feed into said limited opening and onto said delivery means for controlled ingress into said helical conveying element.

4. The intake cup of claim 1, wherein said delivery means for metering feed into said helical conveying element comprises a rotating gear member driven by the movement of said helical conveying member, said gear being mounted horizontally below a centerline of said helical conveying element in said cup body thereby causing feed falling out of said helical conveying element to fall onto said rotating gear member for subsequently redelivering it to the feed conveyor.

5. The intake cup of claim 1, wherein said restricting means comprises a flat plate member mounted horizontally within said cup body above said delivery means so as to shield approximately one half of said limited opening in said open-sleeve in a direction corresponding to a direction of movement of said helical conveying element from said feed being directed downward by said deflector means and having angled flap portions on two sides thereof to prevent feed from entering said void area between said restricting means and said delivery means.

6. A feed metering and directing receptacle for use in conjunction with a conveyor type feeding apparatus including a feed supply tube and having an axially moving auger-like element disposed as part of a feed conveyor system, said receptacle comprising means for receiving feed from said feed supply tube, means for deflecting and directing feed within said receptacle so as to remove a weight force associated therewith from directly bearing upon said auger-like element passing through a bottom portion of said receptacle means, supply means for supplying said feed being contained within said receptacle into said auger-like element, means for partially surrounding said auger-like element within said receptacle and thereby forming a defined opening into which said supply means can deliver feed to said auger-like element and creating a first void area partially surrounding said auger-like element into which feed cannot gain access, and restriction means for further restricting the passage of feed into said auger-like element by way of said defined opening and thereby creating a second void area into which feed cannot flow, said first and second void areas insuring said auger-like element and thus said feed conveyor system does not become over-filled.

7. The feed receptacle of claim 6, wherein said means for receiving said feed from said feed supply tube are located above said bottom portion of said receptacle means where said auger-like element passes through said receptacle means.

8. The feed receptacle of claim 6, wherein said means for deflecting and directing said feed are fixedly attached within said receptacle substantially directly below said means for receiving said means from said feed supply tube and substantially directly above said auger-like element such that some of said feed received is directed toward said defined opening in said means for partially surrounding said auger-like element, and a remaining portion of said feed is directed toward said supply means.

9. The feed receptacle of claim 6, wherein said supply means comprises a gear-wheel mounted for rotation within said receptacle means horizontally below a centerline of said auger-like element so as to allow said gear-wheel to catch feed falling from said auger-like element and return it to said defined, restricted opening into which feed may pass through said means for partially surrounding and into said auger-like element.

10. The feed receptacle of claim 6, wherein said supply means are rotationally driven by said auger-like element moving axially through said feed receptacle.

11. The feed receptacle of claim 6, wherein said means for partially surrounding the auger-like element comprise a C-shaped channel having a top edge thereof disposed adjacent to a bottom edge of said means for directing and deflecting said feed so as to create said first void area between said channel and said auger-like element behind said top edge and thereby prohibit overfilling of said feed conveyor.

12. The feed receptacle of claim 6, wherein said restriction means comprises a flat plate-like member shielding approximately one-half of said defined area in said means for partially surrounding said auger-like element, said shielded area being in a direction the same as a direction of axial movement of said auger-like element through said receptacle and having flaps extending downwardly to prevent feed carried by said supply means from entering said second void area formed beneath said restriction means thus assuring proper feed levels within the feed conveyor system.

13. An intake cup for directing and metering feed within a feeding system having a feed supply tube and an axially moveable conveyor passing through the intake cup, said intake cup comprising means for receiving and directing feed from said feed supply tube to said intake cup and therethrough to said moveable conveyor, means for controlling the area through which feed within the intake cup can flow into the moveable conveyor, and means for creating space at a predetermined location immediately adjacent said moveable conveyor thereby metering the amount of feed carried by the feeding system.

14. The intake cup apparatus as described in claim 13, wherein said means for controlling the area through which feed within the intake cup flows into the moveable conveyor comprises an elongate cylindrical tube member having a lengthwise portion thereof removed to form an open-arc through which feed can flow into the moveable conveyor.

15. The intake cup as described in claim 14, wherein means for creating space at a predetermined location immediately adjacent said moveable conveyor comprises a portion of said elongate cylindrical tube member positioned such that feed is prevented from entering an area between the conveyor and the tube for a limited portion thereof.

16. The intake cup apparatus described in claim 14, wherein said means for creating space at a predetermined location immediately adjacent said moveable conveyor comprises means for preventing feed from entering the moveable conveyor along a portion of the length of said open-arc thereby forming a shielded area adjacent said moveable conveyor.

17. The intake cup apparatus described in claim 16, wherein said means for creating space at a predetermined location immediately adjacent said moveable conveyor further comprises means for removing unwanted feed entering said shielded area.

18. The intake cup apparatus of claim 16, wherein said means for creating space at a predetermined location immediately adjacent said moveable conveyor further comprises a portion of said elongate cylindrical tube member positioned such that feed is prevented from entering an area between the conveyor and the tube for a limited portion thereof.

* * * * *